(12) United States Patent
Anthony

(10) Patent No.: US 6,854,372 B2
(45) Date of Patent: Feb. 15, 2005

(54) ENHANCED MITER SAW (76) Inventor: William Jefferson Anthony, 1002 Great Britain, Austin, TX (US) 78748

(*) Notice: Subject to any disclaimer, the term of this patent is extended or adjusted under 35 U.S.C. 154(b) by 0 days.

(21) Appl. No.: 10/162,349

(22) Filed: Jun. 4, 2002

(65) Prior Publication Data
US 2003/0221531 A1 Dec. 4, 2003

(51) Int. Cl.⁷ ............................................. B27B 27/08
(52) U.S. Cl. ............................ 83/441; 83/422; 83/460; 83/471.3; 83/581
(58) Field of Search ............................. 83/581, 471.3, 83/436.3, 460, 441, 422

(56) References Cited

U.S. PATENT DOCUMENTS

| | | | | |
|---|---|---|---|---|
| 5,365,813 A | * | 11/1994 | Greene | 83/581 X |
| 5,855,366 A | * | 1/1999 | Chang | 83/581 X |
| 5,862,732 A | * | 1/1999 | Itzov | 83/471.3 |
| 5,870,939 A | * | 2/1999 | Matsubara | 83/471.3 |
| 6,073,529 A | * | 6/2000 | Shibata et al. | 83/581 X |
| 6,397,716 B1 | * | 6/2002 | Garuglieri | 83/471.3 |
| 6,425,309 B1 | * | 7/2002 | Stumpf et al. | 83/581 X |
| 6,523,447 B2 | * | 2/2003 | Judge | 83/471.3 |
| 6,550,363 B2 | * | 4/2003 | He | 83/471.3 |

* cited by examiner

Primary Examiner—Charles Goodman
(74) Attorney, Agent, or Firm—Carrie A. Boone, P.C.

(57) ABSTRACT

A miter saw is adapted for performing lengthwise, or rip, operations on a work piece such as wood. A back support arm is positioned off-center such that the work piece can be inserted under the miter saw substantially parallel to the blade. An arcuate aperture in the back support arm ensures that bevel adjustment properly aligns the blade with the blade slot during bevel cuts. An adjustable rail enables the work piece to be positioned in either a normal position, for crosswise cuts, or an orthogonal position, for lengthwise cuts. A toggle switch overrides the on/off switch on the handle, useful when the work piece is fed from behind. Two separate sleeves cover the blade, assuring safety during operation for both lengthwise and crosswise cuts. A tensioning board feed roller holds the work piece in place during lengthwise cutting.

20 Claims, 6 Drawing Sheets

ENHANCED MITER SAW

FIELD OF THE INVENTION

This invention relates to miter saws and, more particularly, to a miter saw adapted to perform lengthwise cuts on a work piece.

BACKGROUND OF THE INVENTION

Building construction is a labor-intensive activity, often employing multiple workers, such as architects, framers, plumbers, electricians, and painters. Each worker may perform a job using specialized tools.

A framer, for example, typically arrives at a building site with one or more tools for performing a framing operation. A house can be framed with a variety of different sized boards, measured in inches as 2×4, 2×6, 2×8, 2×10, or 2×12, in some prespecified length. The house design can include windows or doors, for which the framer cuts, or "chops" the boards down to size. Generally, the framer will have a miter saw for the purpose of cutting the boards.

A miter saw is a large circular saw connected to a housing that supports the material to be cut. The miter saw pivots at the housing so that the blade may be brought down over a work piece such as wood.

The housing of the miter saw includes a turntable assembly that allows angled cuts to be made to the wood. A compound miter saw additionally pivots to one side, allowing bevel cuts to be made. Some compound miter saws even include a sliding mechanism that increases the cutting length of the saw. The sliding mechanism further allows partial cuts, e.g., not all the way through the wood, to be made. Miter saws may be used for crosscuts, picture frame molding, grooves, and tenon joints, to name a few examples.

Sometimes, a framer needs to "rip" a board, wherein the board is cut lengthwise rather than crosswise. Many trim operations, for example, involve rip cuts, such as when facia boards are used for the eaves of a roof. A lengthwise cut of a board may be needed to even out a corner. Even a sliding compound miter saw is inadequate for such operations. Instead, a table saw or a circular saw is used to rip the wood piece.

Table saws, however, are typically not built for travel to a job site. Where the table saw is sturdy enough to be moved, the saw is nevertheless not portable enough for a single worker to transport. Thus, table saws are generally not moved to construction job sites.

In a circular saw, the blade rotates at a high rate of speed to accurately cut the wood. Angled cuts used in framing operations are sometimes difficult using circular saws. Further, the need to perform an angle cut to a board is often not anticipated until work is well underway.

Miter saws, on the other hand, are made for travel. Built with locking mechanisms and of sturdy material, they may be transported to a job site with relative ease.

Thus, there is a continuing need to enhance a miter saw for performing ripping operations.

SUMMARY OF THE INVENTION

According to the embodiments described herein, a miter saw is disclosed comprising a base assembly with a blade slot and a blade assembly, wherein the blade is in a plane with the blade slot during cutting operations. The work piece is fed over and substantially parallel to the blade and the work piece is lengthwise cut. The miter saw further comprises a back support arm coupled to the blade assembly, the back support arm extending in an upward and lateral direction relative to the base assembly from a first position on the base assembly laterally offset from the blade slot.

In one embodiment, the miter saw comprises a board feed roller to rest upon the work piece and to apply tension to the work piece during cutting operations. An adjustable rail on the base assembly is used to position the work piece relative to the blade, for cuts ranging from 0° to 90°.

The miter saw comprises a base assembly for receiving a work piece, the base assembly comprising a table with a blade slot. The miter saw also comprises a back support arm coupling a blade to the base assembly, wherein the back support arm is laterally offset from the blade slot and in a plane with the base assembly; extending in an upward direction relative to the base assembly; and curving laterally over the base assembly. A work piece is received upon the base assembly along the blade slot from a back portion toward a front portion and the work piece is cut lengthwise. In further embodiments, the miter saw comprises a rail for supporting the work piece during cutting operations, wherein the rail can be operated as a backstop during crosswise cutting and as a rip fence during lengthwise cutting.

Advantages and other features of the invention will become apparent from the following description, the drawings, and the claims.

DETAILED DESCRIPTION

In accordance with the embodiments described herein, a miter saw is adapted for performing lengthwise, or rip, operations on a work piece such as wood. A back support arm is positioned off-center such that the work piece can be inserted under the miter saw blade in the direction of the blade slot. An arcuate aperture in the back support arm ensures that the blade meets the blade slot, as during bevel adjustment of the miter saw. An adjustable rail enables the work piece to be positioned in either a backstop position, for crosswise cuts, or a rip fence position, for lengthwise cuts.

Several optional features are also disclosed. A depth lever allows incomplete cuts to be made to the work piece. A toggle switch overrides the on/off switch on the handle, particularly useful during lengthwise cuts. Two separate sleeves cover the blade, assuring safety during lengthwise and crosswise cuts, as well as when the saw is idle. A tensioning roller holds the work piece in place during cutting operations.

In the illustrated embodiments, various references to miter saws are made. Although a sliding compound miter saw is depicted in the drawings, the features described herein may be practiced on different types of miter saws, including, but not limited to, regular miter saws, compound miter saws, and sliding compound miter saws. The embodiments described herein are not intended to limit the scope of the invention.

Figure 1:
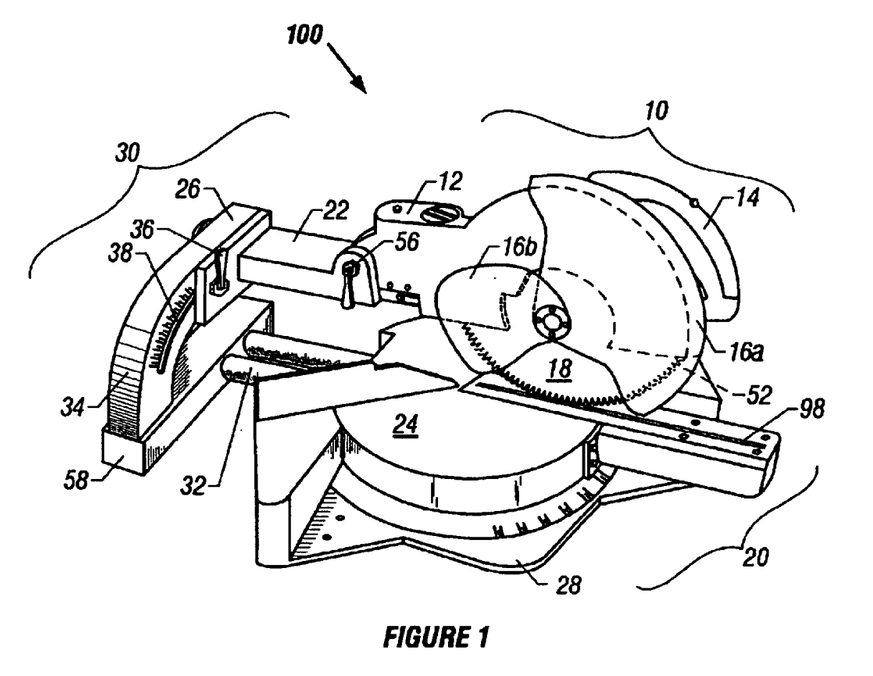
FIG. 1 is a perspective view of an enhanced miter saw according to one embodiment of the invention.

In FIG. 1, according to one embodiment, a miter saw 100 includes features to enable rip, or lengthwise, cuts to be made to a work piece, in addition to being able to perform standard chop, or crosswise, cuts. The miter saw 100 comprises a blade assembly 10, a base assembly 20, and a back support arm 30.

The blade assembly 10 comprises a blade housing 12, a handle 14, two blade sleeves 16a and 16b, and a blade 18. The blade 18 is a rotary saw blade comprising a plurality of cutting teeth 52. Cutting teeth 52 may vary in type and size. Some blades, for example, include a large number of small cutting teeth, such as for precision cabinetry work.

The front blade sleeve 16a and back blade sleeve 16b protect against contact with the blade during use. The front and back blade sleeves are retractable and are biased forward upon moving the handle 14 down during use. The two-piece sleeve of the miter saw 100 is described further in connection with FIG. 8, below.

The base assembly 20 comprises a table 24, which is selectively rotatable and coupled to a stationary base frame 28. The blade housing 12 is pivotably mounted to the table 24 such that, when the table 24 is rotated, the blade 18 likewise is rotated while the base frame 28 remains stationary.

The table 24 is rotated to adjust the angle of the blade for cutting, known as miter adjustment. The blade assembly 10 is moved relative to the back support arm 30, to adjust the bevel angle of the blade, known as bevel adjustment. When a work piece 50, such as wood, is placed on the base frame 28, the work piece does not move; instead, the table beneath the work piece is rotated, the back support arm is adjusted, or both the table and the back support arm are adjusted. Both the table and the back support arm may include locking mechanisms.

The base assembly 20 also includes a blade slot 98 that is part of and extending from the table 24. Movement of the blade 18 is in a plane with the blade slot 98 at all times, whether the cut is perpendicular to the table or not. The operator can thus be assured that the blade will make contact with the work piece 50 at a known point (the blade slot 98) and can position the work piece accordingly.

Standard Operation

The flexibility of miter saws allows a variety of work piece cuts to be made. During miter adjustment, the blade 18 is angled relative to the rail 40b, but remains perpendicular to the base assembly 20. During bevel adjustment, the blade is angled relative to the base assembly, but remains perpendicular to the rail. Miter and bevel adjustments can be made simultaneously or separately, resulting in a variety of different cuts.

Some of the cuts are illustrated in FIGS. 3A–3D. The miter saw 100 could perform any of these cuts. A work piece 50, such as a piece of wood commonly known as a "2×4," is shown. For each cut described, the work piece 50 would be positioned flush against the adjustable rail 40a and 40b of the miter saw 100, shown in FIG. 2.

Figure 3A:
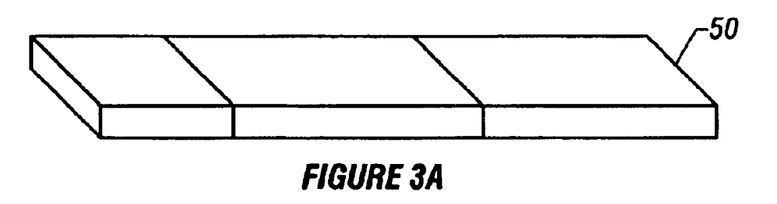
FIGS. 3A–3D are diagrams of various crosswise cuts of a work piece.

FIG. 3A depicts a standard chop, or crosswise cut, of the work piece 50. The crosswise cut is a miter cut. The miter saw 100 performs the chop cut by keeping the pivot angle of the blade 18 perpendicular to the base assembly 20 and to the rail 40.

Figure 3B:
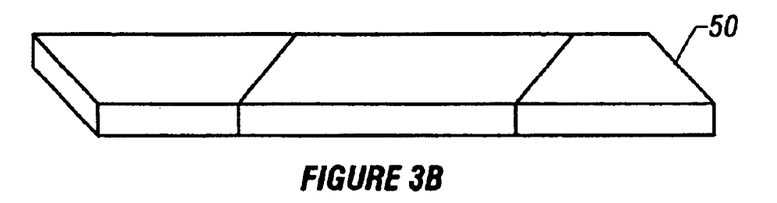

FIG. 3B depicts an angle cut, also a miter cut. The angle cut is performed at an angle on the work piece 50. The miter saw 100 performs the angle cut by keeping the pivot angle of the blade perpendicular to the base assembly, but adjusting the table 24 such that the blade 18 is no longer perpendicular to the rail.

Figure 3C:
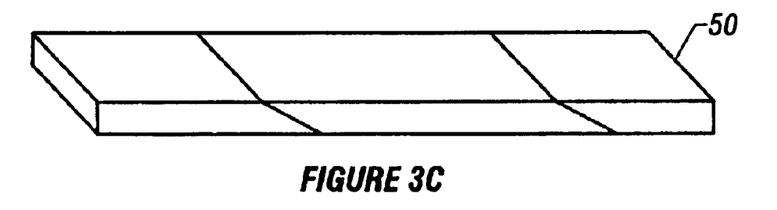

In FIG. 3C, a bevel cut is shown. Also a crosswise cut, the bevel cut is performed by maintaining a perpendicular position between the blade 18 and the rail, but adjusting the bevel adjustment assembly 26 such that the blade is no longer perpendicular to the base assembly (but still meets with the blade slot 98 during cutting).

Figure 3D:
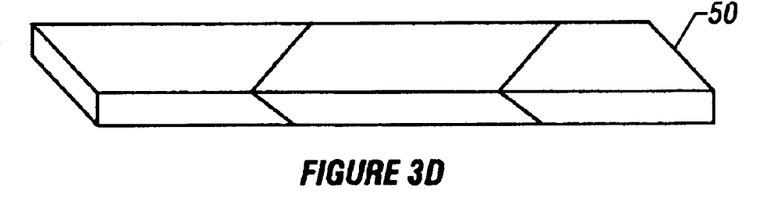

FIG. 3D depicts a compound cut. The miter saw 100 performs the compound cut by both adjusting the table 24 and the bevel adjustment assembly 26. In such an operation, the blade is neither perpendicular to the rail nor to the base assembly.

Figure 4:
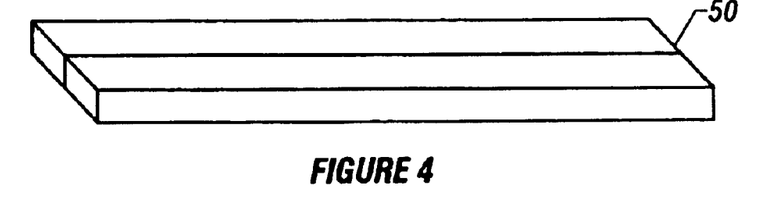
FIG. 4 is a diagram of a lengthwise cut or "rip" of a work piece.

The many cutting arrangements illustrated in FIGS. 3A–3D are useful for a variety of tasks, including carpentry work, frame jobs, and other construction operations. The ability to perform many different cutting operations, as well as its durable construction, make the miter saw a preferred tool for transport to a job site. Nevertheless, one important cutting angle is not possible even using the most advanced miter saws: a lengthwise cut, or rip, of the work piece 50, as illustrated in FIG. 4.

A typical framing job, for example, consists of chopping a number of work pieces into boards of equal size, a task readily performed by the miter saw. However, most framing operations additionally involve rip cuts, such as when doing trim work.

Back Support Arm

Returning to FIG. 1, the blade assembly 10 is coupled to the base assembly 20 by the back support arm 30. The back support arm 30 comprises a base portion 58, a pivot arm 22, and a bevel adjustment assembly 26, including an arcuate arm 34, in one embodiment. The base portion 58 of the back support arm 30 is in a plane with the base frame 28 of the base assembly and is coupled to the sliding mechanism 32, if present. As shown in FIG. 1 the base portion 58 is transverse to the blade slot 98. One end of the base portion, or proximal end, connects to the base assembly 20 and is in a plane with the blade slot 98. The other end of the base portion 58, or distal end, is offset from the blade slot 98 (or left of the blade slot, in FIG. 1) and connects to the arcuate arm 34. A work piece fed into the miter saw from behind first makes contact with the base portion 58.

The bevel adjustment assembly 26 is connected at one end of the base portion (the left side in FIG. 1), leaving an opening through which the work piece can be fed into the blade from behind. In a preferred embodiment, the bottom of the bevel adjustment assembly 26 (i.e., the arcuate arm 34) is at least four inches above the base portion 58 (using a ten-inch blade) or at least six inches above the base portion (using a twelve-inch blade). The inner surface of the arcuate arm 34, at the point it attaches to the base portion 58, is laterally spaced preferably at least six and one half inches from the blade slot 98. Using these preferred dimensions, the opening between the base portion 58 and the arcuate arm 34 is either 4"×6½" (using a ten-inch blade) or 6"×6½" (using a twelve-inch blade). This ensures that a 2"×12" work piece can be fed into the miter saw from behind such that the work piece is cut down the middle (lengthwise) by the miter saw 100.

The bevel adjustment assembly 26 allows the blade to be adjusted such that a work piece can be cut at a variety of bevel angles. The bevel adjustment assembly 26 includes an arcuate arm 34 with arcuate aperture 38 and a lever 36, also shown in FIG. 2. By moving the lever 36, an extension piece such as a rod or pin passing through the bevel adjustment assembly and extending from the pivot arm 22 moves along the arcuate aperture 38. The lever movement causes the pivot arm 22 and, thus, the entire blade assembly 10, to be moved along the arcuate aperture 38. The lever 36 may be lockable such that a fixed position of the blade assembly 10 can be maintained.

The bevel adjustment assembly 26 is further coupled to a sliding mechanism 32, according to one embodiment. The sliding mechanism 32 comprises adjacent rods running through the center of the base assembly 20. The sliding mechanism 32 permits a forward and backward sliding movement of the back support arm 30 and, accordingly, the blade assembly 10, during use. The sliding mechanism 32 and the bevel adjustment assembly 26 are secured in a fixed unitary relationship to each other.

Sliding compound miter saws generally permit longer crosscuts (e.g., greater than 10") to be made. The blade 18, for example, may be pivoted downward and then slid toward the front of the base assembly 20, for a longer length cut.

Figure 2:
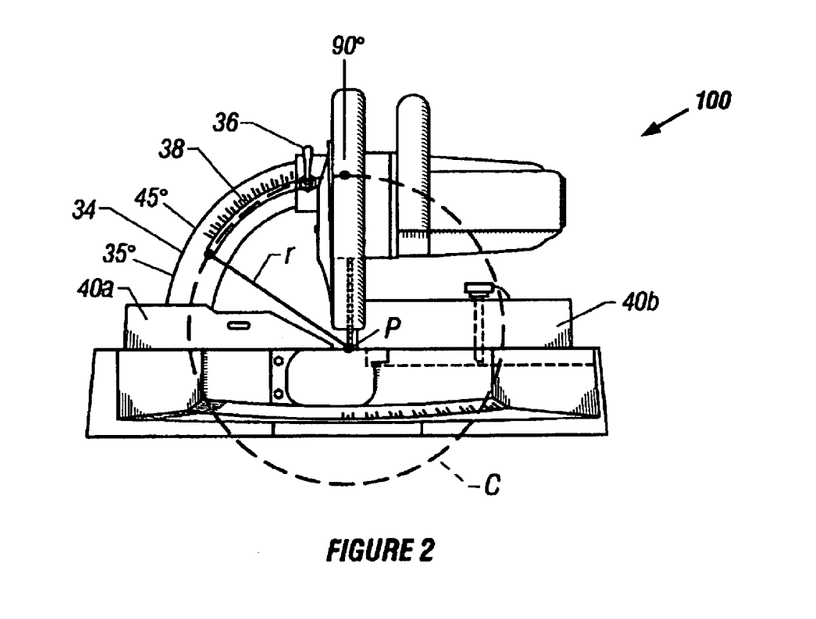
FIG. 2 is a front overhead view of the enhanced miter saw of FIG. 1.

FIG. 2 further illustrates how the bevel adjustment assembly 26 operates. A point, P, represents where the back support arm connects to the base assembly in prior art miter saws. During either miter adjustment, in which the table is moved, or bevel adjustment, in which the back support arm is moved, the blade always meets the blade slot or, in other words, is planar with the blade slot, when the back support arm connects to the base assembly at P.

Because the miter saw 100 is able to receive work pieces lengthwise in the direction of the blade slot, the back support arm is moved out of the way of any incoming work piece. Further, the back support arm is arched to the left of the blade slot 98, in the embodiment shown. An imaginary circle, C, with a radius, r, is drawn around point P to illustrate how the arcuate aperture 34 is designed to follow the path of C. With the arcuate aperture 38 controlling the bevel adjustment of the blade 18, bevel cuts as well as miter cuts will remain planar with the blade slot 98 at all times. Also, the blade 18 can be adjusted from a 90° position (relative to the table assembly) to at least a 45° position. In a preferred embodiment, the blade can be adjusted about 10° past the 45° position (e.g., 35° from the plane of the base assembly).

In one embodiment, the back support arm extends back from the blade assembly such that, when the blade is adjusted for miter cuts, the back support arm does not touch the work piece. For example, when the cutting angle is at 55° (see FIG. 1, e.g.), the left side of the back support arm does not adversely affect the position of the work piece.

Adjustable Rail

FIG. 2 also depicts adjustable rails 40a and 40b. The adjustable rails 40a and 40b are support pieces against which the work piece is positioned before cutting operations. The adjustable rails include a slidable portion 40a and a pivotable portion 40b. In FIG. 2, the slidable portion 40a is on the left side while the pivotable portion 40b is on the right side. When a work piece is positioned against the adjustable rail 40b, as shown in FIG. 2, chop, or crosswise, cuts to the work piece are performed.

In some prior art miter saws, the rail is a two-piece supporting fence connected to the base frame 28 that is transverse to and on either side of the blade slot 98. The work piece 50 is positioned along the rail before cutting operations commence. The rail provides stability and, thus, ensures accuracy during the cutting operation. One or both of the rail pieces can be moved laterally along a track. The track is essentially a channel for adjusting the position of the rail. The movement of the rail does not change the position of the work piece, but, instead, changes how the work piece is supported. The rail is moved, for example, when a relatively wide work piece is to be cut.

Figure 5A:
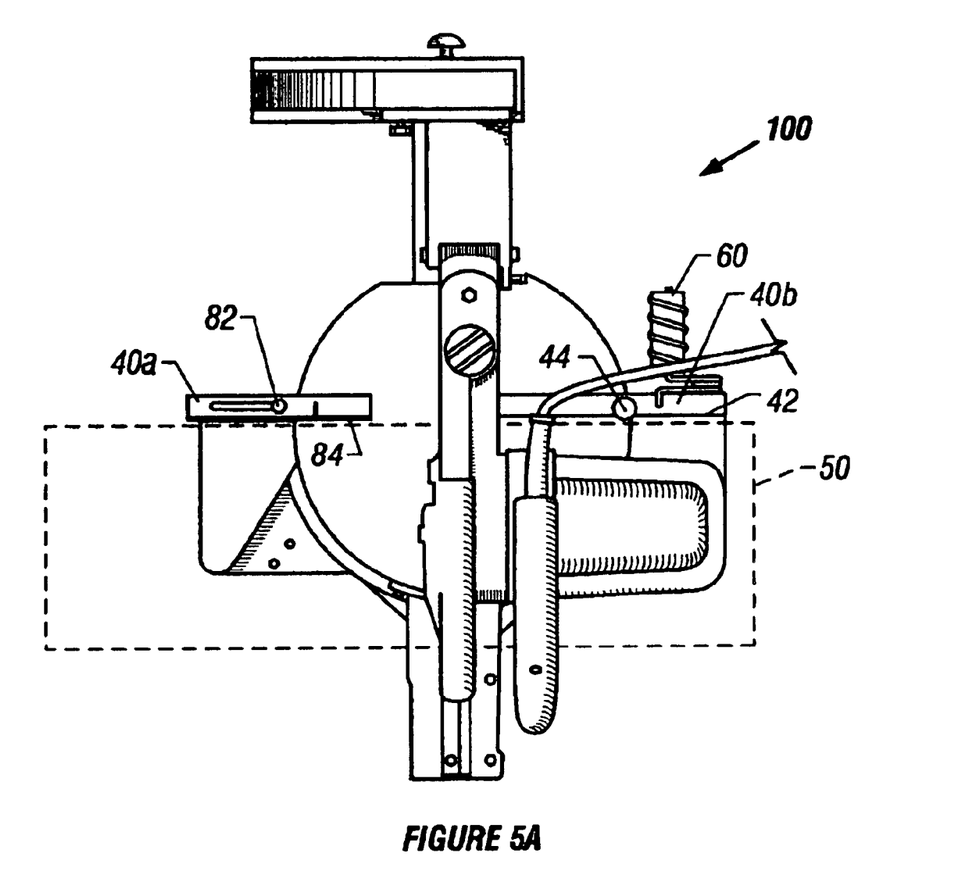
FIG. 5A is a bird's eye view of the miter saw of FIG. 1 with an adjustable rail in the backstop position according to another embodiment of the invention.
Figure 5B:
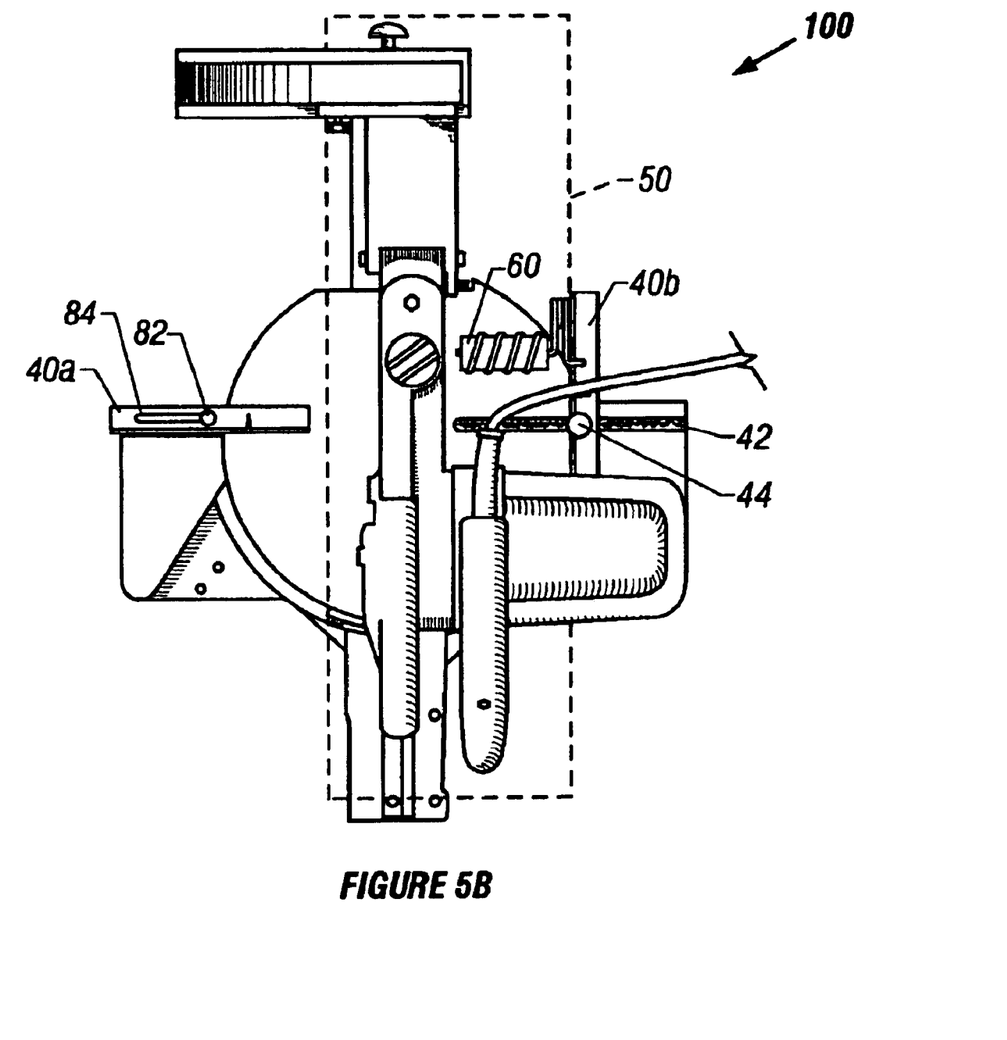
FIG. 5B is a bird's eye view of the miter saw of FIG. 5A with the adjustable rail in the rip fence position.

In the miter saw 100, the adjustable rail 40b includes a fastener 44 and a track 42, as shown in FIGS. 5A and 5B, according to one embodiment. In contrast to prior art miter saws, the pivotable rail 40b can be moved not just laterally (e.g., along the track 42), but also orthogonal to the track, as in FIG. 5B. When moved laterally, the pivotable position 40b is in a "back stop" portion (FIG. 5A); when moved orthogonally, the pivotable portion 40b is in a "rip fence" position (FIG. 5B).

When viewing the adjustable rail from overhead, the rail 40b moves counter-clockwise when changing from the backstop to the rip fence positions. One side of the rail (the side without the board feed roller) is used to support the work piece when the rail is in the backstop position. The opposite side of the rail (the side with the board feed roller) is used to support the work piece when the rail is in the rip fence position.

In one embodiment, the fastener 44 of the pivotable portion 40b has a bolt 48 that slides along the track 42. A more detailed depiction of the fastener 44 is provided in conjunction with the description of FIG. 7, below. The track 42 extends along the pivotable portion 40b, but not the slidable portion 40a. The pivotable portion 40b is adjustable both laterally (along the track) and orthogonally (at a right angle to the track).

While not coupled to the track 42, the slidable portion 40a nevertheless may be adjusted toward or away from the blade 18. As shown in FIGS. 5A and 5B, the slidable portion 40a includes a pin 82 which engages through an elongated slot or groove 84, permitting the slidable portion to be adjusted laterally without a track.

The miter saw 100 performs lengthwise cuts on a work piece 50 by changing the position of the pivotable portion 40b of the adjustable rail 40. In the overhead view of the miter saw 100 (FIG. 5A), the adjustable rail 40b is shown in its typical configuration (backstop position), as in FIG. 2. In FIG. 5B, in contrast, the pivotable portion 40b is positioned perpendicular to the typical configuration (rip fence position). In the rip fence position, the pivotable portion 40b is rotated ninety degrees from the backstop position. By aligning the work piece 50 against the rail 40b, a lengthwise cut of the work piece is possible.

In the rip fence position (FIG. 5B), the pivotable portion 40b is perpendicular to the track 42. While in the rip fence position, the pivotable portion 40b can be adjusted laterally, e.g., toward or away from the blade 18, as desired. In the rip fence position, the pivotable portion 40b affects the width of the rip cut, as determined by its position toward or away from the blade 18.

Board Feed Roller

During crosswise (chop) operations, the blade 18 rotates in a forward direction (e.g., clockwise in FIG. 1) and the work piece is stationary. When lengthwise (rip) operations are performed, the work piece is fed into the blade along the blade slot 98. The clockwise rotation of the blade 18 may, left alone, cause the work piece 50 to lift up off the base assembly 10. To counter this effect, in one embodiment, a board feed roller 60, as shown in FIGS. 5A and 5B, imparts a tension on the work piece 50 such that the work piece remains flush against the base assembly during cutting operation.

In FIGS. 5A and 5B, the board feed roller 60 is coupled to the pivotable portion 40b of the adjustable rail. In addition to imparting tension onto the work piece during rip operations, the board feed roller 60 also operates as a finger-stop, preventing fingers from getting too close to the blade 18.

In FIG. 5A, the board feed roller 60 extends perpendicular to and behind the pivotable rail 40b, while the rail is in the backstop position. During crosswise cutting, the board feed roller is not used.

In FIG. 5B, when the pivotable rail 40b is moved into the rip fence position, the board feed roller 60 rotates along with the rail and, likewise, extends perpendicular to the rail. A tensioned wire 88 biases the roller in position against the base frame, such that any work piece under the board feed roller is held in place. Because the work piece 50 is preferably fed into the miter saw 100 from behind and the blade is rotated clockwise, the board feed roller imparts tension on the work piece, improving both accuracy and safety during rip operations.

While in the backstop position (FIG. 5A), the work piece is flush against the non-roller side of the pivotable rail. While in the rip fence position (FIG. 5B), the work piece is flush against the roller side of the pivotable rail. Thus, both sides of the pivotable rail are potentially used for support of the work piece.

Figure 7:
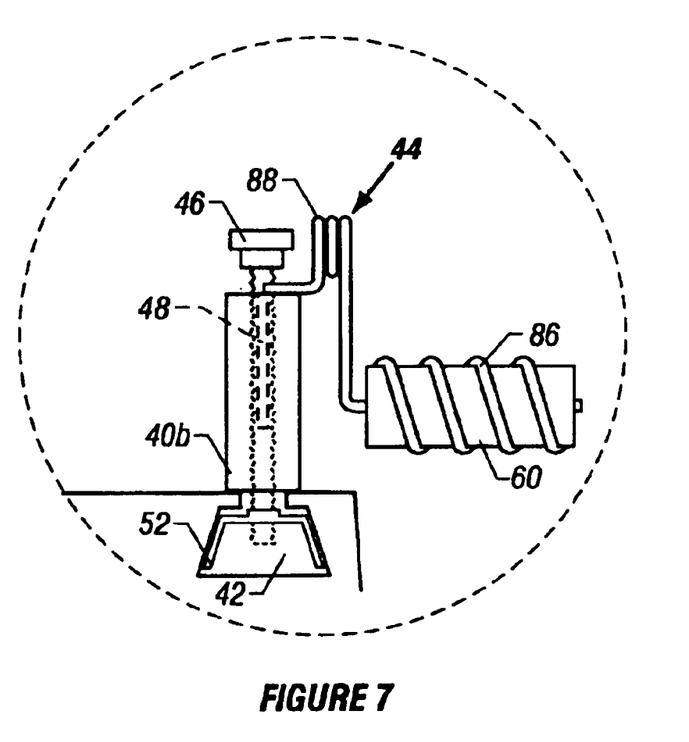
FIG. 7 is an exploded view of the rail fastener and board feed roller within circle 7 of FIG. 6 according to one embodiment of the invention.

The board feed roller 60 is illustrated in FIG. 7, according to one embodiment. The roller portion includes elastomeric striations 86, which allow the roller to engage with the work piece and roll while maintaining contact as the work piece is moved.

In one embodiment, the tensioned wire 88 is connected to a position on top of the rail, extends laterally and relatively close to the rail, loops around twice, and extends back laterally to a position below the original contact point with the rail, at which point the tensioned wire connects to the board feed roller.

The arrangement of the tensioned wire 88 ensures that the board feed roller is continuously biased in a downward position, causing tension against any work piece placed beneath the roller. At the same time, the tensioned wire allows work pieces of varying thicknesses to be placed underneath the board feed roller.

In one embodiment, the pivotable rail 40b is on the left side of the blade 18 (as viewed from FIGS. 5A and 5B) while the slidable rail 40a is on the right side of the blade. This configuration allows sizeable work pieces to be cut lengthwise or crosswise, by being fed into the miter saw from the right.

Rail Fastener

The pivotable rail 40b includes a fastener 44, depicted in FIG. 7 according to one embodiment. The pivotable rail 40b can be changed from the backstop position (FIG. 5A) to the rip fence position (FIG. 5B), and vice-versa, by loosening the fastener 44. Further, the pivotable rail 40b can be moved laterally along the track 42 using the fastener 44. Once the desired rail position is achieved, the fastener 44 is secured.

The fastener 44 can be a screw, a bolt, a clip, a clamp, or other fastening means. Further, the fastener 44 can be spring-loaded or include mechanical means for limiting its movement. In one embodiment, the pivotable rail 40b assumes either the backstop or rip fence positions only. In other words, the pivotable portion 40b cannot be secured at an angle other than ninety degrees (rip fence) or parallel (backstop) to the track 42.

Figure 6:
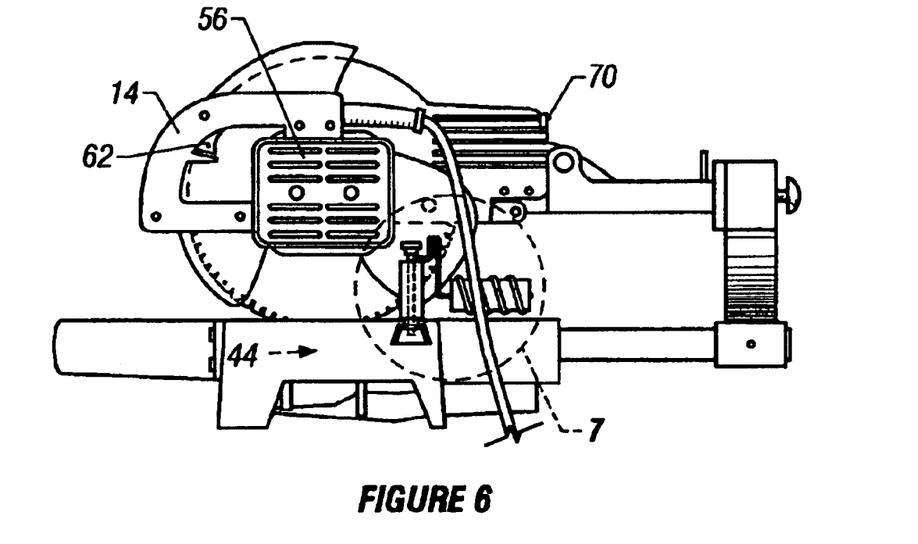
FIG. 6 is a side view of the miter saw of FIG. 5A including a power switching mechanism, a rail fastener, and a board feed roller.

One implementation of the fastener 44 is depicted in FIGS. 6 and 7. A side view of the miter saw 100 is illustrated in FIG. 6. The fastener 44 passes through the pivotable portion to engage it to the base assembly 20.

In FIG. 7, the fastener 44 includes a head 46, a bolt 48, and a nut 52. The head 46 is coupled to the bolt 48 such that, when turned, the bolt 48 rotates through the pivotable portion and into the nut 52. When the rail portion 40b is in the back stop position (FIG. 5A) or in the rip fence position (FIG. 5B), the head 46 can be secured tightly to the rail.

In one embodiment, the track 42 is beveled as shown, with the top portion of the track being thinner than the bottom portion. The beveled track 42 prevents sawdust from clogging the track during operation of the miter saw 100. The nut 52 is preferably shaped to maintain a reasonably snug fit with the track 42. When the head 46 is tightened, movement of the screw lock is limited, enabling the bolt 48 to tightly engage with the nut 52.

Power Toggle Button

In FIG. 6, the blade 18 is powered by pressing an on/off switch 62 located at the front of the miter saw 100 on the handle 14. During standard chopping operations, the on/off switch 62 is convenient. In the miter saw 100, the on/off switch 62 is coupled to the blade motor 56, which is connected to the handle 14, as shown.

During ripping operations, the on/off switch is not convenient for the operator. In one embodiment, the work piece 50 to be ripped is fed into the miter saw 100 from behind, so the operator is preferably also behind the miter saw. Further, as explained below, the blade assembly locking mechanism 56 preferably controls the position of the blade during ripping operations, rendering the handle 14 unnecessary.

Thus, according to one embodiment, a power toggle button 70 is located on the back of the blade housing 12, as shown in FIG. 6. The power toggle button 70, once depressed, changes the power state of the miter saw 100 and overrides the on/off switch 62. When the power toggle button 70 is depressed while the motor 56 is on, the motor turns off; when depressed again, the motor 56 turns on.

When a ripping operation is commenced, the operator depresses the power toggle button 70. To stop the motor, the operator again depresses the power toggle button 70. The button is thus a convenient access to power when the operator is positioned behind the miter saw 100.

Blade Assembly Locking Mechanism

When the miter saw 100 is used to cut a board crosswise, the handle 14 of the blade assembly 10 is pulled forward, the blade sleeve 16a rotates in an upward position, exposing the cutting teeth 52 of the blade 18. The blade 18 then lowers down upon the work piece 50 and the work piece is chopped. Likewise, when the handle 14 is released, the blade sleeve 16a moves downward, covering the blade 18 and the blade assembly 10 moves back up, returning to its idle position. In this manner, the blade sleeve 16a provides a measure of safety.

A slightly different operation of the miter saw 100 may be preferred during lengthwise cuts of the work piece 50. For example, when ripping a board using a table saw, the saw is locked into position and the work piece is moved, even though the work piece remains flush against a guard rail or other mechanism to ensure accuracy of the cut.

Similarly, in one embodiment, the miter saw 100 includes a blade assembly locking mechanism 56, as depicted in FIG. 1. The blade assembly locking mechanism 56 locks the blade assembly 10, once a desired position of the blade 18 is obtained. While the locking mechanism 56 biases the blade into an upper at rest position, the blade may also be locked in a down position as well.

Locking the blade assembly 10 in a down position is desirable, for example, when partial cuts, e.g., cuts that do not pass entirely through the work piece, are made. The blade assembly locking mechanism 56 can be used during crosswise or lengthwise cutting operations.

Two-Part Blade Sleeve

Typically, the blade sleeve is a protective covering designed to limit unintended or unwanted access to the blade. The blade sleeve exposes the blade during cutting operations, but offers protection to the miter saw operator both during cutting operations and when the miter saw is idle.

Figure 8:
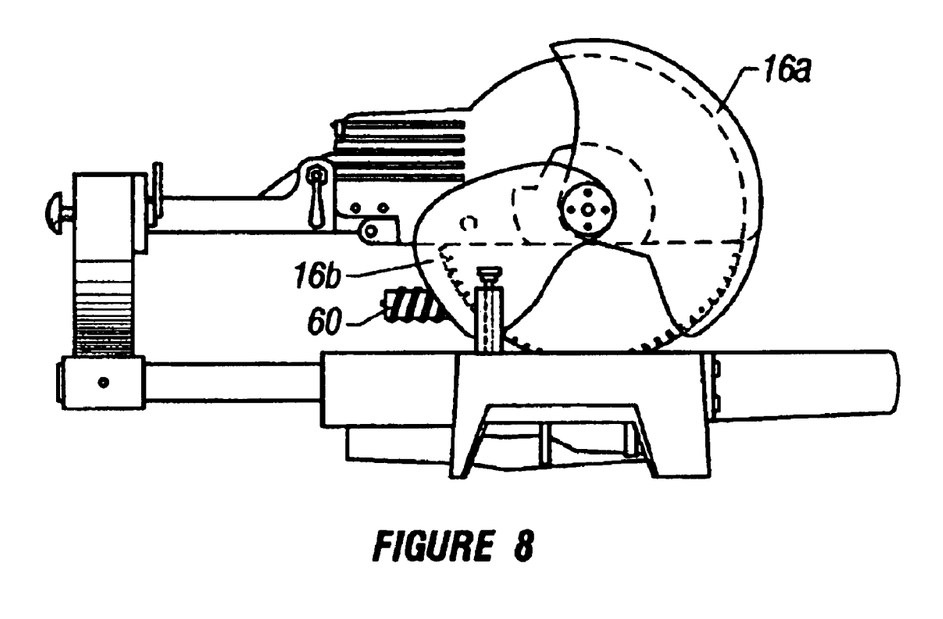
FIG. 8 is a side view of a miter saw similar to that shown in FIG. 1 featuring a two-part blade sleeve and board feed roller according to another embodiment of the invention.

In the miter saw 100, the blade sleeve comprises two separate portions, a front blade sleeve 16a and a back blade sleeve 16b, as shown in FIG. 8. Both blade sleeves cover the blade 18 when the miter saw 100 is in a rest position. The blade sleeves 16a and 16b are connected to the blade housing 12 at the center of the blade 18. The center point acts as a pivot point for each blade sleeve. Depending on the thickness of the work piece, the back blade sleeve 16b may not change position during up or down movement of the blade, in one embodiment.

The front blade sleeve 16a rotates in an upward position when the handle 14 is pulled forward. This exposes the cutting teeth 52 just before the work piece 50 is cut. Once the handle 14 is released and pulled back to an idle position, the front blade sleeve 16a rotates back downward, automatically covering the cutting teeth 52.

The back blade sleeve 16b covers the back of the blade 18 when the miter saw is idle. The back blade sleeve is spring-loaded and moves upward slightly when a work piece pushes against the sleeve or, where present, against the board feed roller 60. Thus, the back blade sleeve 16b is useful when the work piece 50 is fed from behind the miter saw 100. Because the blade assembly may be locked in place, as described above, the cutting teeth 52 are exposed prior to the ripping operation. This safety concern is obviated by the back blade sleeve 16b.

In FIG. 8, both blade sleeves are depicted according to one embodiment of the invention. The back blade sleeve 16b is smaller than the front blade sleeve 16a. During crosswise (chop) cutting, the back blade sleeve 16b moves up when the blade 18 is moved downward. The back blade sleeve 16b may actually make contact with the work piece 50 during ripping operations. Thus, during both chopping (crosswise) and ripping (lengthwise) cuts, the blade 18 of the miter saw is protected. Both blade sleeves 16a and 16b are spring-loaded.

While the invention has been described with respect to a limited number of embodiments, those skilled in the art will appreciate numerous modifications and variations therefrom. It is intended that the appended claims cover all such modifications and variations as fall within the true spirit and scope of the invention.

I claim:

1. A miter saw comprising:
   a base assembly for receiving a work piece, the base assembly comprising a table with a blade slot extending between a front portion and a back portion and an adjustable rail, wherein the adjustable rail is capable of operating as a backstop or as a rip fence;
   a blade assembly comprising a blade and a blade housing, wherein the blade is in a plane with the blade slot during cutting operations and the adjustable rail is perpendicular to the blade when operating as a backstop and parallel to the blade when operating as a rip fence.

2. The miter saw of claim 1, further comprising:
   a back support arm coupled to the blade assembly, the back support arm comprising:
      a base portion, the base portion having a proximal end and a distal end, the proximal end being connected to the base assembly; and
      a bevel adjustment assembly, comprising an arcuate arm connected to the distal end of the base portion and being curved in an arc before connecting to the blade assembly;
   wherein an opening between the arcuate arm and the base portion allows a work piece to be fed into the miter saw from behind the blade assembly.

3. The miter saw of claim 2, wherein the opening is at least four inches in length, measured vertically from the blade slot.

4. The miter saw of claim 2, wherein the opening is at least six inches in width, measured horizontally from the blade slot.

5. The miter saw of claim 1, further comprising:
   a rail against which the work piece is position on the base assembly for cutting.

6. The miter saw of claim 5, wherein the rail is positioned to operate as a rip fence.

7. The miter saw of claim 5, wherein the rail is positioned to operate as a backstop.

8. The miter saw of claim 5, the rail further including a fastener that secures the rail to the base assembly, wherein the fastener allows the rail to be positioned as a backstop or as a rip fence.

9. The miter saw of claim 5, wherein the rail further comprises a board feed roller under which the work piece rests when the rail is positioned as a rip fence, wherein the board feed roller applies tension to the work piece during cutting operations.

10. The miter saw of claim 1, further comprising a power toggle button and an on/off switch, wherein the on/off switch turns a motor on or off and the power toggle button:
    turns the motor off when the motor is on; and
    turns the motor on when the motor is off.

11. The miter saw of claim 2, wherein the arcuate arm further comprises an arcuate aperture for adjusting the blade such that the blade is in a plane with the blade slot during bevel adjustment.

12. The miter saw of claim 1, wherein the blade assembly further comprises a locking mechanism for locking the angle of the blade in a prespecified position.

13. The miter saw of claim 1, wherein the blade assembly further comprises a front blade sleeve to cover the blade during cutting operations.

14. The miter saw of claim 13, wherein the blade assembly further comprises a back blade sleeve to cover the blade when the work piece is fed into the miter saw from behind.

15. A miter saw comprising:

a blade;

a base assembly for receiving a work piece, the base assembly comprising a table with a blade slot extending between a front portion and a back portion the base assembly further comprising an adjustable rail; and a back support arm coupling the blade to the base assembly, wherein the back support arm is:

laterally offset from the blade slot so that the work piece can be fed into the miter saw from behind wherein the adjustable rail is disposed parallel to the blade while the work piece is cut lengthwise.

16. The miter saw of claim 15, wherein the adjustable rail is positioned parallel to the blade while the work piece is cut crosswise.

17. The miter saw of claim 15, wherein the rail is operated as a backstop during crosswise cutting.

18. The miter saw of claim 17, wherein the rail is operated as a rip fence during lengthwise cutting.

19. The miter saw of claim 15, wherein the back support arm further comprises an arcuate aperture for adjusting an angle of the blade relative to the table such that the blade is maintained in a plane with the blade slot during bevel adjustment.

20. The miter saw of claim 17, wherein the rail is further coupled to a board feed roller to apply tension to the work piece while the work piece is being cut.

* * * * *